(12) United States Patent
Pettigrew et al.

(10) Patent No.: US 9,205,586 B2
(45) Date of Patent: Dec. 8, 2015

(54) HYBRID INJECTION MOLDING SYSTEM

(71) Applicant: The HC Companies, Inc., Twinsburg, OH (US)

(72) Inventors: Doug Pettigrew, Wilsonville (CA); Douglas Heald, Warren, OH (US)

(73) Assignee: The HC Companies, Inc., Twinsburg, OH (US)

( * ) Notice: Subject to any disclaimer, the term of this patent is extended or adjusted under 35 U.S.C. 154(b) by 0 days.

(21) Appl. No.: 14/269,475

(22) Filed: May 5, 2014

(65) Prior Publication Data
US 2014/0328969 A1    Nov. 6, 2014

Related U.S. Application Data

(60) Provisional application No. 61/819,111, filed on May 3, 2013.

(51) Int. Cl.
*B29C 45/36* (2006.01)
*B29C 45/26* (2006.01)

(52) U.S. Cl.
CPC ......... *B29C 45/2673* (2013.01); *B29K 2905/02* (2013.01); *B29K 2905/10* (2013.01)

(58) Field of Classification Search
CPC ...... B29C 47/15; B29C 47/20; B29C 47/682; B29C 45/2673
USPC ...................................... 425/190, 192 R, 185
See application file for complete search history.

(56) References Cited

U.S. PATENT DOCUMENTS

| | | | | |
|---|---|---|---|---|
| 4,653,995 | A | * | 3/1987 | Ward .............................. 425/190 |
| 4,861,254 | A | * | 8/1989 | Takeuchi et al. ............... 425/190 |
| 8,297,963 | B2 | * | 10/2012 | Yang .............................. 425/185 |
| 8,702,412 | B2 | * | 4/2014 | Judd et al. ...................... 425/121 |

\* cited by examiner

*Primary Examiner* — Tim Heitbrink
(74) *Attorney, Agent, or Firm* — Haynes and Boone, LLP

(57) ABSTRACT

An injection molding system includes a cavity assembly and a core assembly. The core assembly includes a core plate, a core skeleton secured to the core plate, and a removable core body insert defining a mold shape, secured to the core skeleton. The cavity assembly includes a core plate with a circular groove and a gate pad disposed in the groove, providing an entry point for liquefied resin material. The cavity assembly further includes a cavity insert disposed on the gate pad, forming an inner cavity for receiving liquefied resin material via the gate pad and for receiving the removable core body insert of the core assembly. The core assembly further includes a cavity skeleton with a circular opening for providing access to the inner cavity, disposed over the cavity insert and the gate pad, and secured to the cavity plate.

27 Claims, 8 Drawing Sheets

HYBRID INJECTION MOLDING SYSTEM

RELATED APPLICATIONS

This application claims priority to U.S. Provisional Patent Application No. 61/819,111, filed on May 3, 2013, entitled "HYBRID INJECTION MOLDING SYSTEM."

FIELD OF INVENTION

The present disclosure relates to the field of injection molding. More particularly, the present invention relates to customizable and disposable injection molds.

BACKGROUND

Products and parts for various applications and industries must be produced cost-effectively and efficiently in order to meet customer pricing demands. Injection molding is one example of a manufacturing process used to efficiently produce various products of various materials. For example, flower pots may be manufactured using a steel mold that represents a desired shape and style. Appropriate material is injected into the mold cavity and pressed or stamped to take the shape of the mold, thereby producing a flower pot of the desired shape and style upon cooling.

Injection molds may only be used for a single shape and style, however. Producing a different shape and style for example, requires a different mold. Steel injection molds may be expensive to manufacture and therefore it may not be cost effective to replace a steel injection mold with a new steel injection mold every time a new shape or style flower pot is desired. Furthermore, producing injection molds using alternative materials may not yield effective results since alternative materials may not have the same strength properties as steel. Specifically, the injection mold may not be capable of withstanding the forces exerted by a stamping or pressing tool during the manufacturing process.

SUMMARY OF THE INVENTION

An injection molding system includes a core assembly and a cavity assembly. The core assembly includes a core plate, a core skeleton secured to the core plate, and a removable core body insert defining a mold shape, secured to the core skeleton. The cavity assembly includes a core plate with a circular groove and a gate pad disposed in the groove, providing an entry point for liquefied resin material. The cavity assembly further includes a cavity insert disposed on the gate pad, forming an inner cavity for receiving liquefied resin material via the gate pad and for receiving the removable core body insert of the core assembly. The core assembly further includes a cavity skeleton having a circular opening for providing access to the inner cavity, disposed over the cavity insert and the gate pad, and secured to the cavity plate.

A core assembly of an injection molding system is configured to be pressed into a cavity assembly and filled with liquid resin. The core assembly includes a core plate, a core skeleton secured to the core plate, an interchangeable core body insert defining a mold shape, removably secured to the core skeleton, and a core cap for providing a water transfer point, disposed on the removable core body insert.

An injection molding system includes a cavity assembly and a modular core assembly. The modular core assembly is configured to receive a selected core body insert defining a mold shape and configured to be pressed into the cavity assembly.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
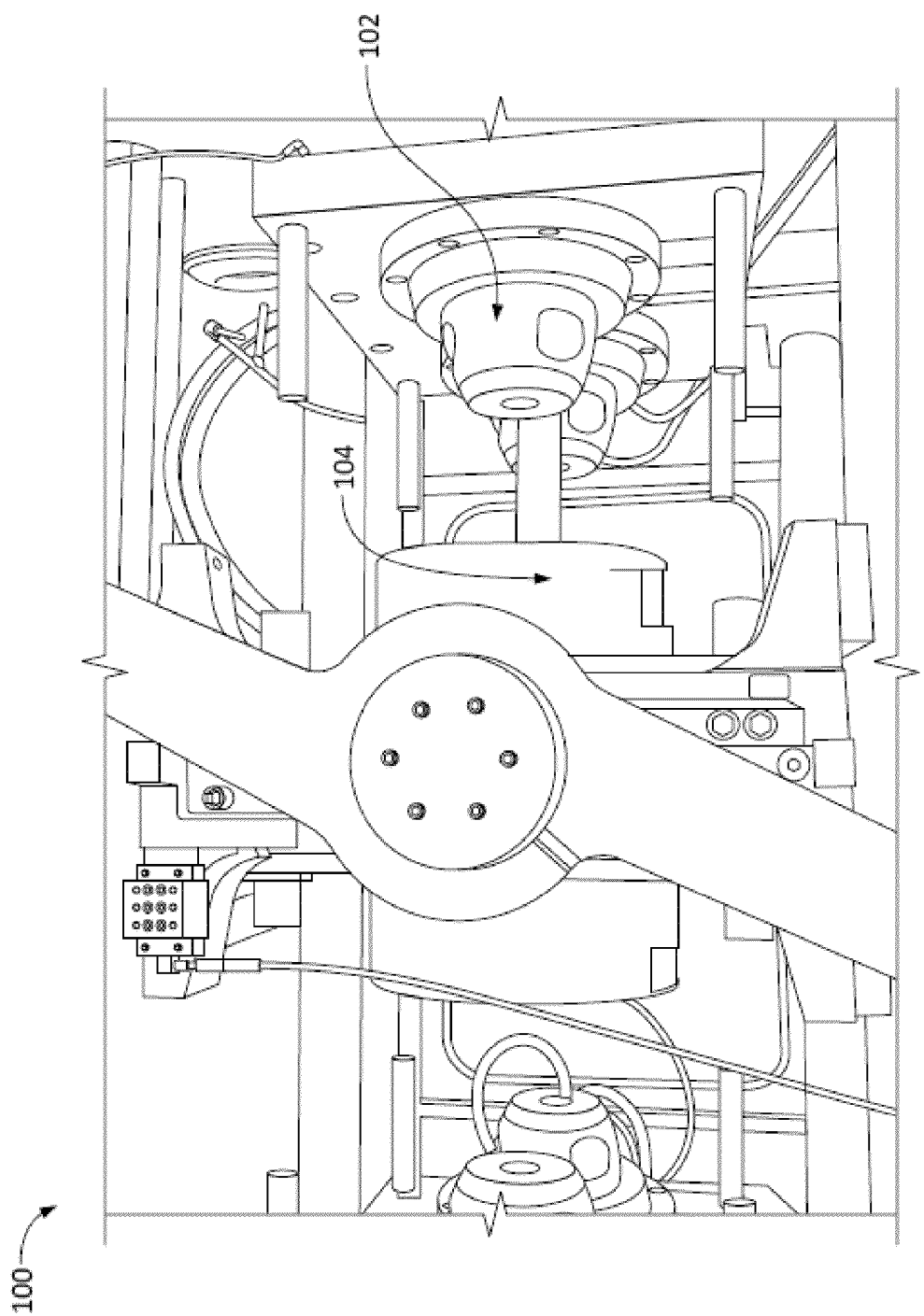
FIG. 1 illustrates an example customizable injection molding system.

FIG. 1 illustrates an example customizable injection molding system 100, including a core assembly 102 and a cavity assembly 104, for manufacturing flower pots using suitable polymer materials such as polyethylene and polypropylene. It should be understood that, although system 100 is described as one configured to manufacture flower pots, system 100 may be configured to manufacture other suitable products or parts of varying materials.

Figure 2:
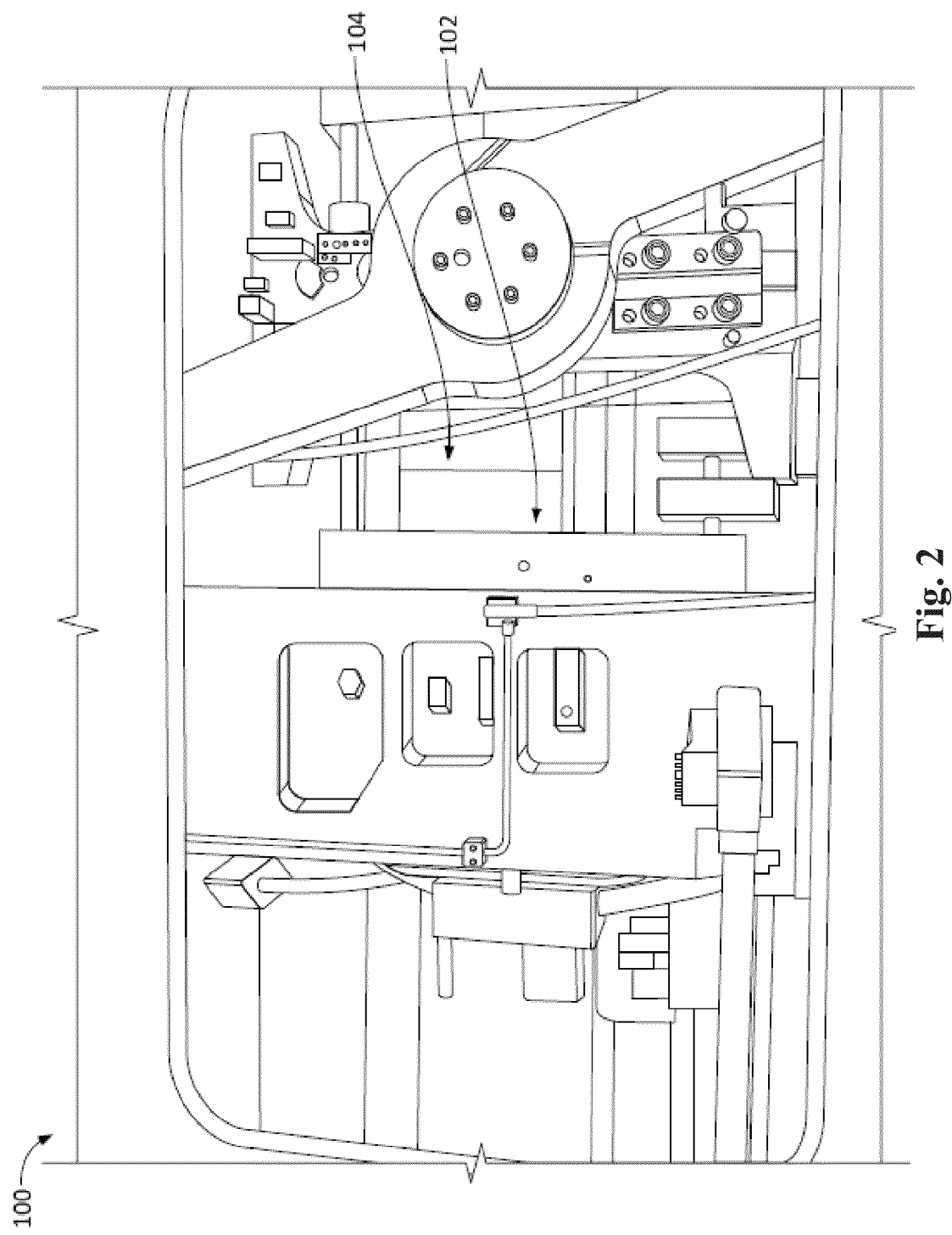
FIG. 2 illustrates an example customizable injection molding system.

FIG. 2 depicts a core assembly 102 of system 100 pressed into a cavity assembly 104. For injection molding applications, the core assembly 102 is positioned under pressure up against the cavity assembly 104, with tonnage being applied across all mating surfaces of system 100. Liquefied resin material is then pressed into system 100 under high pressure and into the spaces created between the core assembly 102 and cavity assembly 104. Once cooled, the resin material takes the form of a part, such as a flower pot, that must be removed from the mold.

In order to efficiently accommodate changes in market conditions and in consumer demand, core assembly 102 is configured to be customizable and relatively disposable in order to enable system 100 to manufacture flower pots or other suitable products of varying shapes and sizes on an increasingly short turnaround time.

Figure 3:
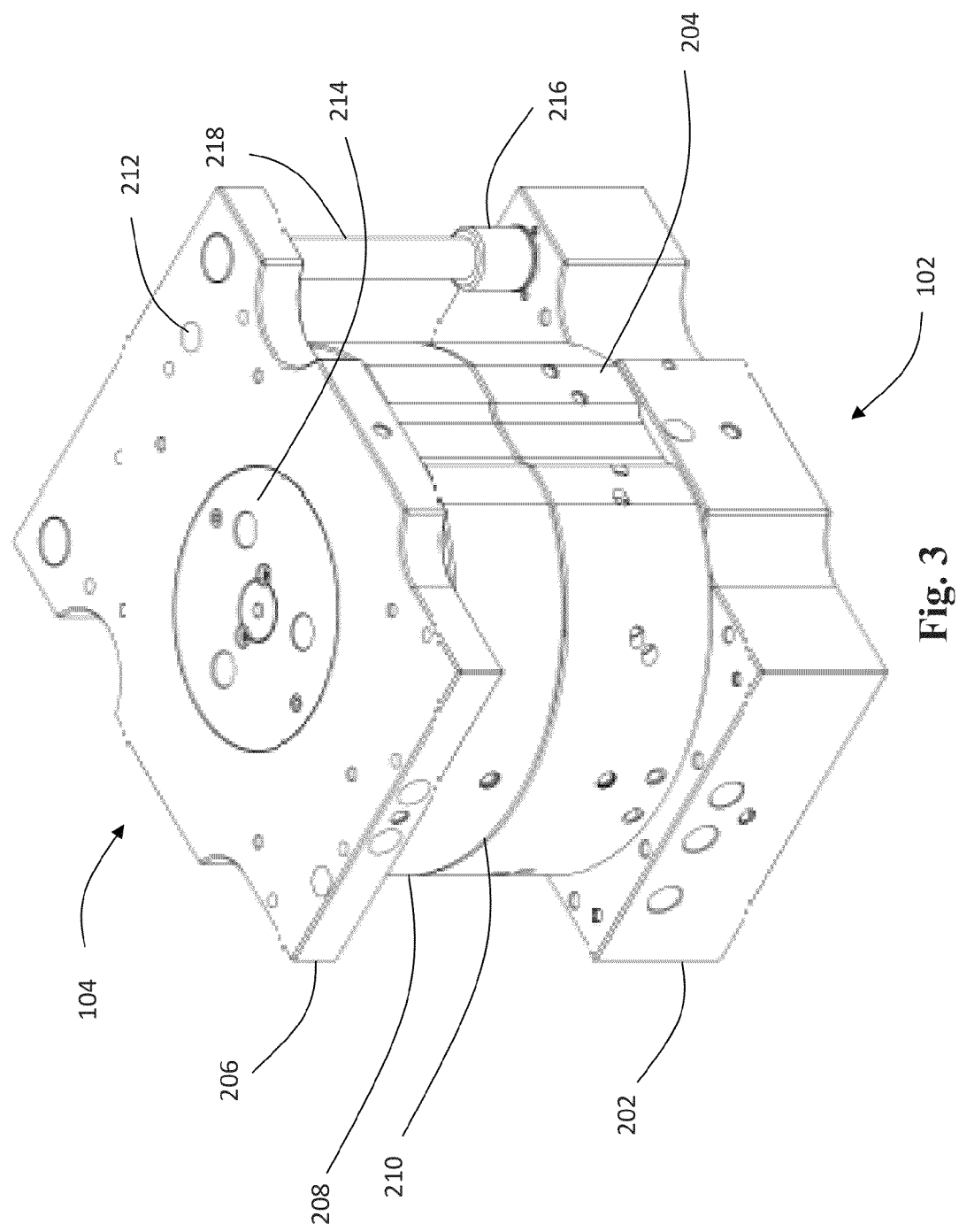
FIG. 3 illustrates a perspective view of an example core assembly and an example cavity assembly.

FIG. 3 illustrates a perspective view of core assembly 102 and cavity assembly 104 pressed together. Core assembly 102 includes a core plate or platform 202 configured to provide support for a core skeleton 204. Cavity assembly 104 includes a cavity plate 206 configured to provide support for a cavity skeleton 208. As core platform 202 is moved by system 100 towards cavity plate 206, core skeleton 204 presses against cavity skeleton 208 to form a flush connection 210. Assembly hardware 212 secures core skeleton 204 and cavity skeleton 208 to core platform 202 and cavity plate 206 respectively. Cavity assembly 104 also includes a gate pad 214, which is the entry point for the liquefied resin material.

In one example, core skeleton 204 and cavity skeleton 208 are formed of steel. In another example, core skeleton 204 and cavity skeleton 208 are formed of other suitable materials capable of withstanding the pressures exerted on core skeleton 204 and cavity skeleton 208 as system 100 moves core plate 202 towards cavity plate 206.

It should be understood that, although core platform 202 and cavity platform 206 are illustrated as providing support for a single core skeleton 204 and cavity skeleton 208 respectively, core platform 202 and cavity platform may be configured to provide support for multiple core skeletons and cavity skeletons, respectively, in order to facilitate production of multiple parts or products simultaneously.

Core assembly 102 further includes guide post receivers 216 disposed on core plate 202, configured to receive guide posts 218 disposed on cavity platform 206 and to help core assembly 102 align with cavity assembly 104 as they are moved towards each other.

Figure 4:
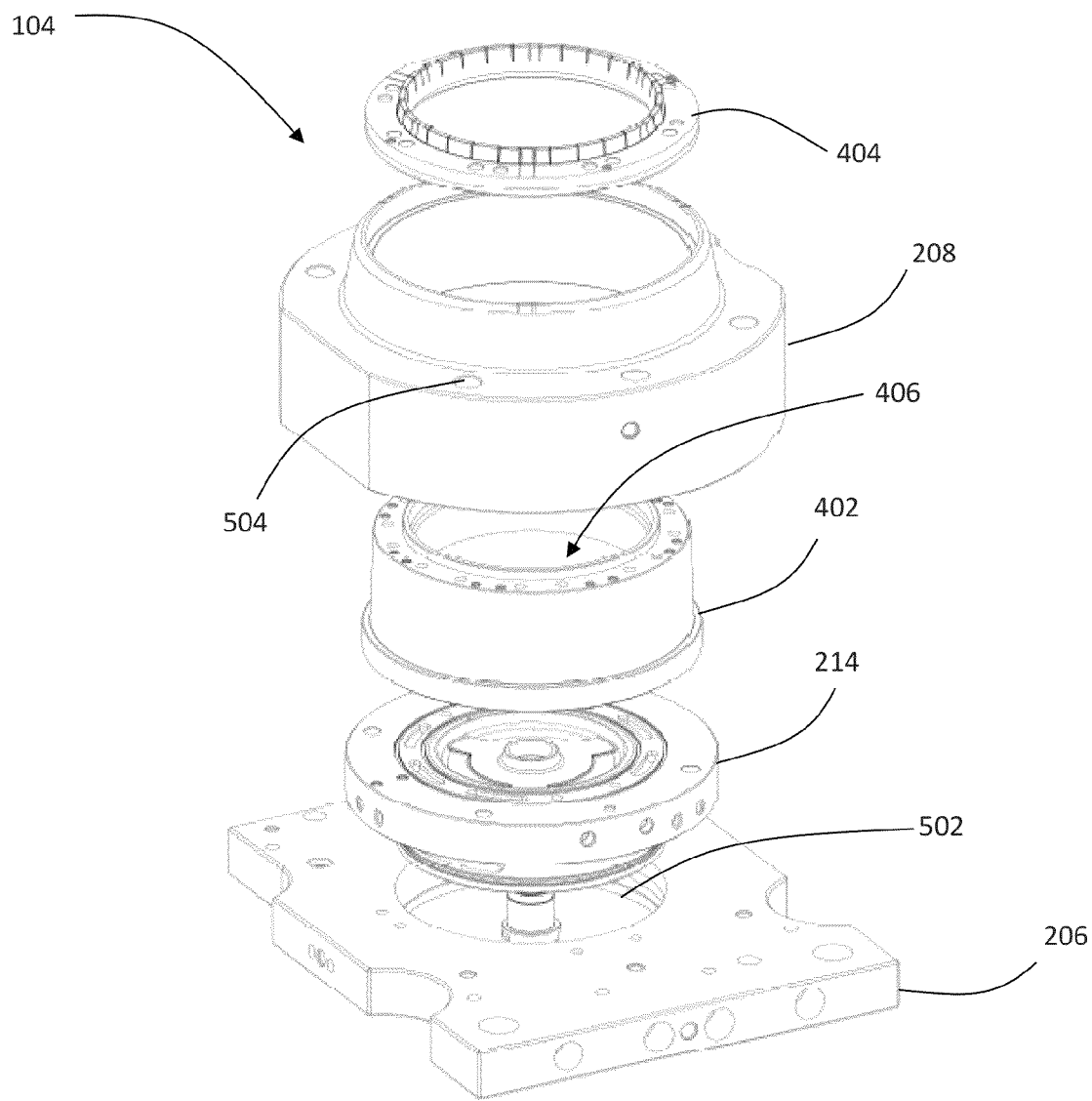
FIG. 4 illustrates an exploded isometric view of an example cavity assembly.

FIG. 4 illustrates an exploded isometric view of the example cavity assembly 104. Cavity plate 206 acts as a base and provides support for cavity assembly 104. A gate pad 214 is inserted into a circular groove 502 of cavity plate 206. An aluminum cavity insert 402 rests on top of the gate pad 214 and forms the inner cavity 406 for receiving liquefied resin material. Cavity skeleton 208 provides the outer structure of cavity assembly 104 and secures in place gate pad 214 and cavity insert 402. Cavity skeleton 208 includes a circular opening for providing access to the inner cavity 406. Cavity skeleton 208 is secured to cavity plate 206 by inserting assembly hardware 212 into assembly receiving holes 504. The cavity skeleton 208, cavity plate 206, and gate pad 214 are all made of steel.

A lip ring 404 is secured to the top or end of cavity skeleton 208 and configured to absorb at least some of the impact when cavity assembly 104 and core assembly 102 are pressed together. Lip ring 404 may also be configured to draw heat away from the finished molded product. Lip ring 404 may be made of brass, copper, or other suitable materials capable of absorbing such an impact. Cavity assembly 104 also includes guide posts 218 for providing guidance and alignment when receiving core assembly 102 (as shown in FIG. 3).

Figure 5:
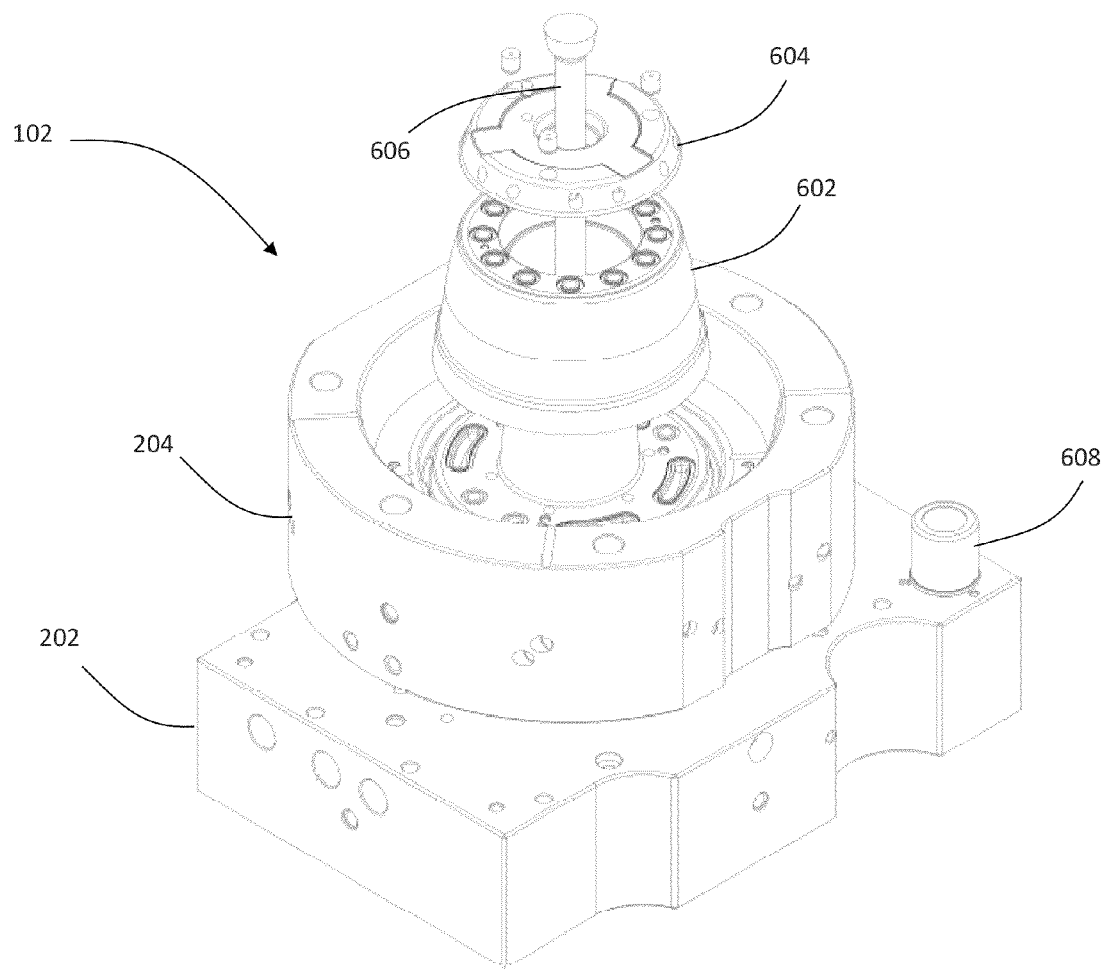
FIG. 5 illustrates an exploded isometric view of an example core assembly.

FIG. 5 illustrates an exploded isometric view of an example core assembly 102. Core plate 202 acts as a base and provides support for core assembly 102. A core skeleton 204 is mounted on core plate 202. Core skeleton 204 and the core plate 202 are made of steel or other suitable material capable of withstanding and absorbing the impact from being pressed against cavity skeleton 208.

An aluminum core body insert 602, along with cavity insert 402, defines the mold shape for a flower pot or other product being manufactured by system 100. Core body insert 602 is the portion of core assembly 102 that is received by inner cavity 406 of cavity assembly 104 when cavity assembly 104 is pressed to core assembly 102.

Figure 6:
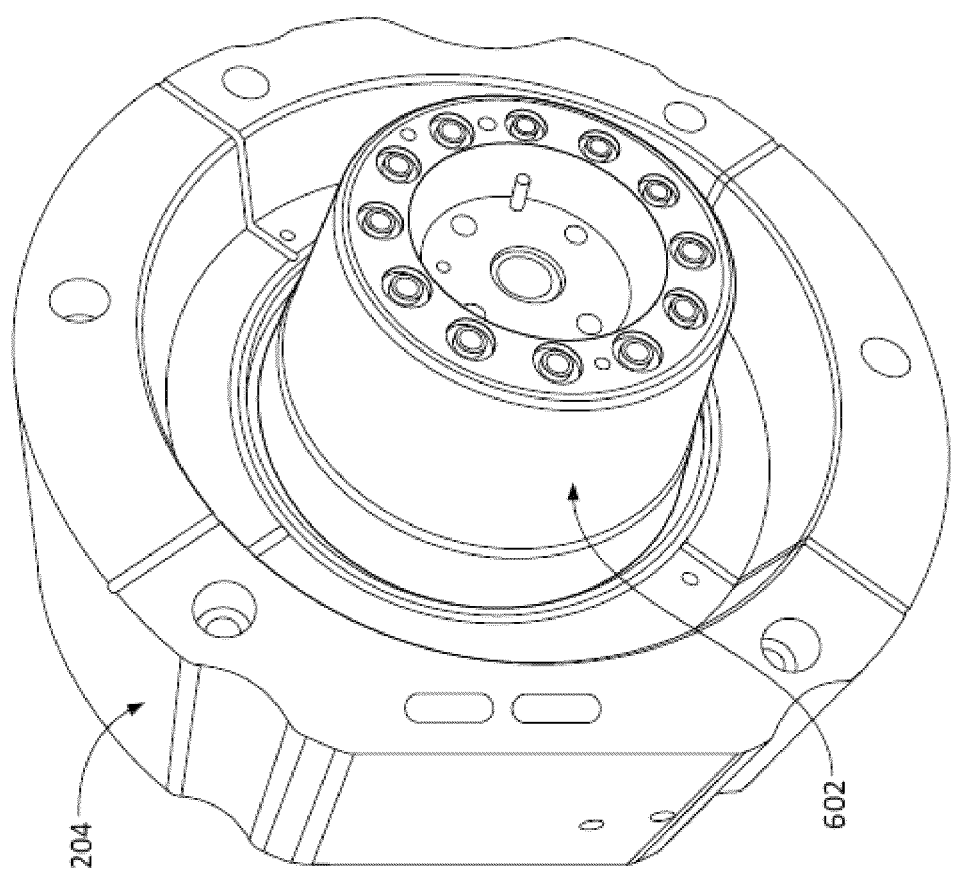
FIG. 6 illustrates an example core body insert and an example core skeleton.

FIG. 6 illustrates core body insert 602 positioned on and secured to core skeleton 204. The aluminum core body insert 602 is removable and can be replaced with core body inserts of varying sizes and shapes. In other words, core body insert 602 is interchangeable. Accordingly, core assembly 102 is modular and can be customized to produce flower pots or other products of varying shapes and sizes by selecting a core body insert of a desired shape and size and by replacing a first core body insert of a first shape or size with a selected core body insert of a second shape or size. Core body insert 602 may be composed of aluminum or other suitable material.

Figure 7:
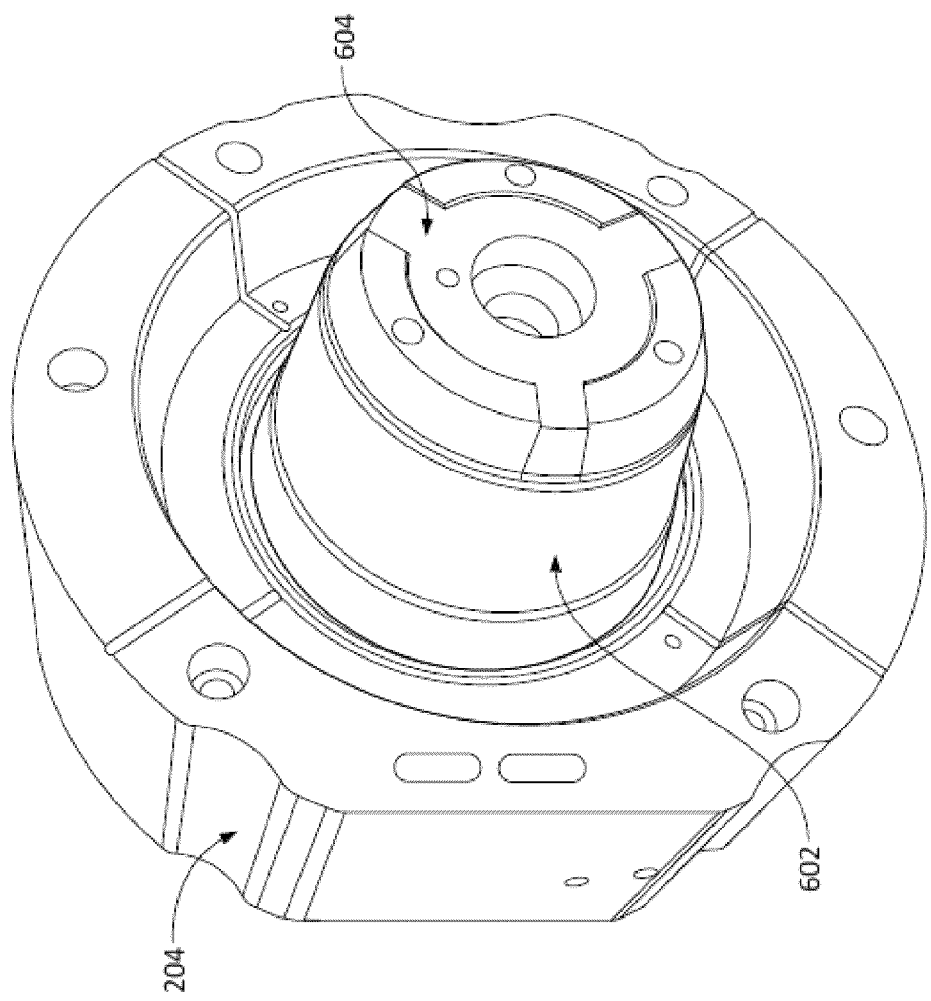
FIG. 7 illustrates an example core cap, an example core body insert, and an example core skeleton.

Referring back to FIG. 5, core assembly 102 includes a core cap 604 configured to provide a water transfer point or a water turnaround point to help prevent corrosion in core body insert 602, as well as designed paths for air flow to assist the de-molding process. FIG. 7 illustrates a core cap 604 positioned on a core body insert 602 secured to a core skeleton 204. Core cap 604 may be composed of aluminum or other suitable material.

Figure 8:
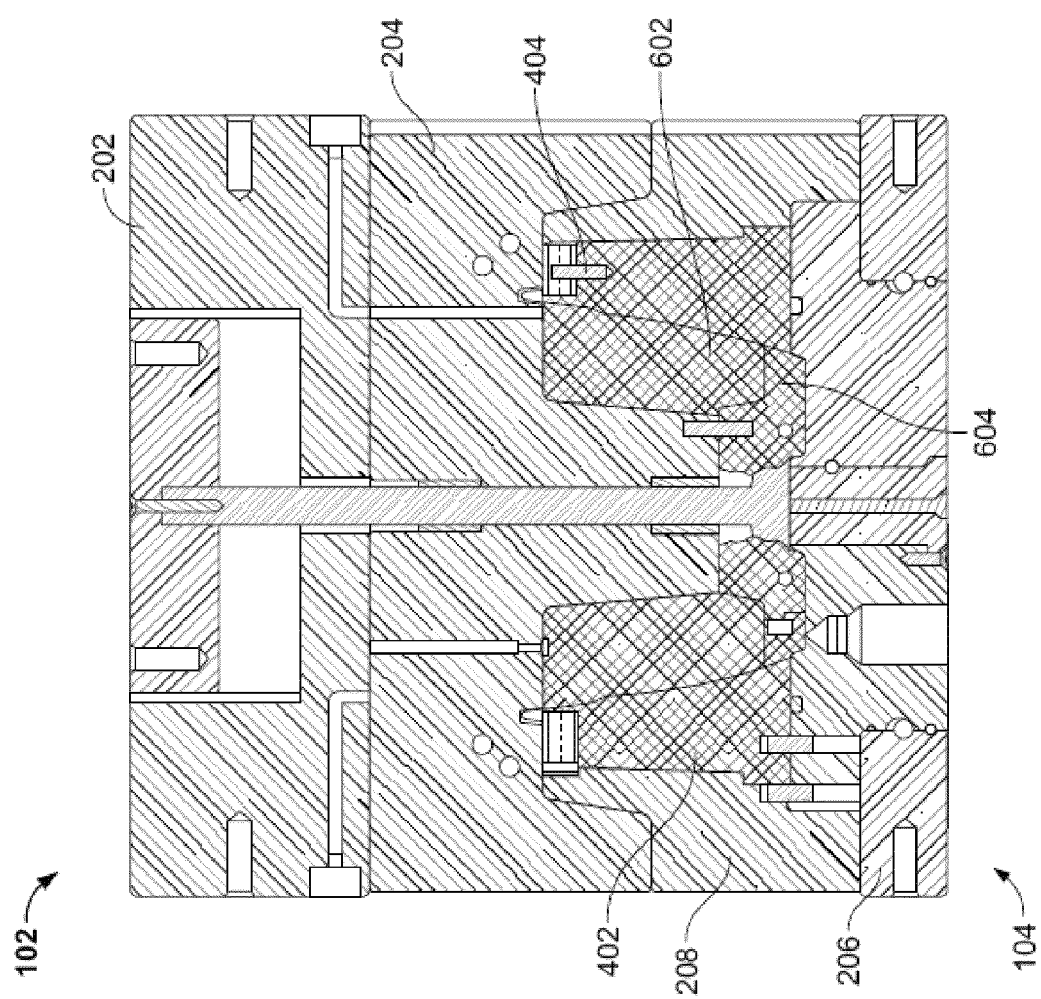
FIG. 8 illustrates a cross-section view of an example cavity assembly and an example core assembly.

FIG. 8 illustrates a cross-section view of cavity assembly 104 and core assembly 102 pressed together, as illustrated in FIG. 3. Core assembly 102 has core plate 202 supporting core skeleton 204. Secured to core skeleton 202 is core insert 602. Core cap 604 is secured to core insert 602. Cavity assembly 104 has cavity plate 206 supporting cavity skeleton 208. Lip ring 404 is secured to cavity skeleton 208. Cavity insert 402, secured in place by cavity skeleton 208, creates a cavity for receiving core insert 602 as core assembly 102 is pressed against cavity assembly 104.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

The invention claimed is:

1. An injection molding system comprising:
   a core assembly comprising:
      a core plate;
      a core skeleton secured to the core plate; and
      a removable core body insert defining a mold shape, secured to the core skeleton; and
   a cavity assembly comprising:
      a cavity plate comprising a circular groove;
      a gate pad disposed in the groove, providing an entry point for liquefied resin material;
      a cavity insert disposed on the gate pad, forming an inner cavity for receiving liquefied resin material via the gate pad and for receiving the removable core body insert of the core assembly; and
      a cavity skeleton comprising a circular opening for providing access to the inner cavity, disposed over the cavity insert and the gate pad, and secured to the cavity plate;
   wherein the core assembly further comprises a core cap disposed on the removable core body insert.

2. An injection molding system comprising:
   a core assembly comprising:
      a core plate;
      a core skeleton secured to the core plate; and
      a removable core body insert defining a mold shape, secured to the core skeleton; and
   a cavity assembly comprising:
      a cavity plate comprising a circular groove;
      a gate pad disposed in the groove, providing an entry point for liquefied resin material;
      a cavity insert disposed on the gate pad, forming an inner cavity for receiving liquefied resin material via the gate pad and for receiving the removable core body insert of the core assembly; and a cavity skeleton comprising a circular opening for providing access to the inner cavity, disposed over the cavity insert and the gate pad, and secured to the cavity plate;

wherein the cavity assembly further comprises a lip ring disposed at an end of the cavity skeleton.

3. The injection molding system of claim 2, wherein the lip ring is configured to absorb heat.

4. The injection molding system of claim 2, wherein the lip ring comprises one of copper and brass.

5. The injection molding system of claim 2, wherein the system further comprises:

a plurality of core skeletons secured to the core plate; and
a plurality of cavity skeletons secured to the cavity plate.

6. The injection molding system of claim 2, wherein the core skeleton comprises steel, and wherein the cavity skeleton comprises steel.

7. The injection molding system of claim 2, wherein the cavity insert comprises aluminum, and wherein the removable core body insert comprises aluminum.

8. The injection molding system of claim 2, wherein the cavity plate comprises at least one guide post, and wherein the core plate comprises at least one guide post receiver for receiving the guide post and for aiding in the alignment of the cavity plate and the core plate.

9. A core assembly of an injection molding system, the core assembly being configured to be pressed into a cavity assembly, the core assembly comprising:

a core plate;
a core skeleton secured to the core plate;
an interchangeable core body insert defining a mold shape, removably secured to the core skeleton; and
a core cap for providing a water transfer point, disposed on the removable core body insert.

10. The core assembly of claim 9, wherein the interchangeable core body is configured to be pressed into an inner cavity of the cavity assembly.

11. The core assembly of claim 9, wherein the core assembly further comprises a plurality of core skeletons secured to the core plate.

12. The core assembly of claim 9, wherein the interchangeable core body insert comprises aluminum.

13. The core assembly of claim 9, wherein the core assembly further comprises at least one guide post receiver for receiving a guide post and for aiding in the alignment of the core assembly and the cavity assembly.

14. An injection molding system comprising a cavity assembly and a core assembly, the core assembly configured to receive a selected core body insert defining a mold shape and configured to be pressed into the cavity assembly;
wherein the cavity assembly comprises:

a cavity plate comprising a circular groove;
a gate pad disposed in the groove, providing an entry point for liquefied resin material;
a cavity insert disposed on the gate pad, forming an inner cavity for receiving liquefied resin material via the gate pad and for receiving the selected core body insert of the core assembly;
a cavity skeleton comprising a circular opening for providing access to the inner cavity, disposed over the cavity insert and the gate pad, and secured to the cavity plate; and
a lip ring for absorbing at least a portion of an applied force, disposed at an end of the cavity skeleton.

15. An injection molding system comprising a cavity assembly and a core assembly, the core assembly configured to receive a selected core body insert defining a mold shape and configured to be pressed into the cavity assembly;
wherein the core assembly comprises:

a core plate;
a core skeleton secured to the core plate; and
a core cap for providing a water transfer point, disposed on the selected core body insert;
wherein the selected core body insert is secured to the core skeleton.

16. The injection molding system of claim 14, wherein the cavity skeleton comprises steel, and wherein the cavity insert comprises aluminum.

17. The injection molding system of claim 15, wherein the core skeleton comprises steel, and wherein the selected core body insert comprises aluminum.

18. The injection molding system of claim 15, wherein the core assembly is configured to receive a plurality of selected core body inserts.

19. The injection molding system of claim 14, wherein the core assembly is configured to receive a plurality of selected core body inserts.

20. The injection molding system of claim 1, wherein the system further comprises:

a plurality of core skeletons secured to the core plate; and
a plurality of cavity skeletons secured to the cavity plate.

21. The injection molding system of claim 1, wherein the core skeleton comprises steel, and wherein the cavity skeleton comprises steel.

22. The injection molding system of claim 1, wherein the cavity insert comprises aluminum, and wherein the removable core body insert comprises aluminum.

23. The injection molding system of claim 1, wherein the cavity plate comprises at least one guide post, and wherein the core plate comprises at least one guide post receiver for receiving the guide post and for aiding in the alignment of the cavity plate and the core plate.

24. The injection molding system of claim 1, wherein the cavity assembly further comprises a lip ring disposed at an end of the cavity skeleton.

25. A cavity assembly of an injection molding system, the cavity assembly comprising:

a cavity plate comprising a groove;
a gate pad disposed in the groove, providing an entry point for liquefied resin material;
a cavity insert disposed on the gate pad, forming an inner cavity for receiving liquefied resin material via the gate pad and for receiving a core body insert of a core assembly;
a cavity skeleton comprising an opening for providing access to the inner cavity, disposed over the cavity insert and the gate pad, and secured to the cavity plate; and
a lip ring for absorbing at least a portion of an applied force, disposed at an end of the cavity skeleton.

26. The cavity assembly of claim 25, wherein the lip ring is configured to absorb heat.

27. The cavity assembly of claim 25, wherein the lip ring comprises one of copper and brass.

* * * * *